United States Patent
Beal (10) Patent No.: US 6,302,079 B1
(45) Date of Patent: Oct. 16, 2001

(54) DUAL IGNITION AND CONTROLLED INTAKE ROTARY MOTOR AND METHOD OF OPERATION

(76) Inventor: Kevin Beal, P.O. Box 203396, Austin, TX (US) 78720

( * ) Notice: Subject to any disclaimer, the term of this patent is extended or adjusted under 35 U.S.C. 154(b) by 0 days.

(21) Appl. No.: 09/501,832

(22) Filed: Feb. 10, 2000

Related U.S. Application Data (60) Provisional application No. 60/120,060, filed on Feb. 16, 1999.

(51) Int. Cl.[7] .................................................. F02B 53/00
(52) U.S. Cl. ........................................... 123/249; 418/191
(58) Field of Search .................................. 123/249, 235, 123/238; 418/191, 188, 187

(56) References Cited

U.S. PATENT DOCUMENTS

| | | | | |
|---|---|---|---|---|
| 1,704,938 | * | 3/1929 | Gardes ................................. | 418/191 |
| 3,923,014 | * | 12/1975 | Knickerbocker ................. | 418/191 X |
| 4,747,762 | * | 5/1988 | Fairbairn .............................. | 418/191 |
| 6,079,386 | * | 6/2000 | Barker et al. ........................ | 123/249 |

* cited by examiner

*Primary Examiner*—Hoang Nguyen
(74) *Attorney, Agent, or Firm*—Gunn, Lee & Keeling (57) ABSTRACT

The present invention is directed toward a rotary combustion motor and method of operation. The rotary combustion engine has dual rotors that are driven by timed combustions of fuel in a large combustion chamber and a small combustion chamber. Intake valving is also provided by dual intake rotors, each of which provide a time delivery of fuel to the large combustion chamber and the small combustion chamber. Gears control the timing between each of the rotors.

20 Claims, 8 Drawing Sheets

0 degrees

Fig 3a

60 degrees

Fig 3b

120 degrees

Fig 3c

180 degrees

Fig 3d 240 degrees

Fig 3e 300 degrees

DUAL IGNITION AND CONTROLLED INTAKE ROTARY MOTOR AND METHOD OF OPERATION

This application claims the benefit of U.S. Provisional Application No. 60/120,060 filed Feb. 16, 1999.

BACKGROUND OF THE INVENTION

1. Field of The Invention

The present invention relates to rotary motors, and more particularly, to an improved rotary piston and motor having a regulated air intake and methodology. The regulated intake mechanism allows the rotary motor to efficiently achieve maximum revolutions per minute (rpm). Additionally, the rotary motor shown is designed to accommodate a dual ignition mechanism. The combination of a dual ignition mechanism with a regulated intake applied to a rotary motor results in a superior motor design with respect to rpm and overall efficiency.

2. Background Information

Reciprocating engine motors on the market today generally involve pistons which are thrust in one direction as a result of combustion. Generally, where one piston is thrust in an upward direction a second is thrust downward. However, the pistons may rest at non-vertical angles with respect to one another resulting in a more side to side movement. Whatever the case, once a piston reaches a maximum velocity it must come to a complete stop and be forced in the opposite direction. This process repeats over and over again as the engine runs. The fundamental design of a motor with this version of reciprocating parts is inefficient. This version of a reciprocating parts motor involves an inherent defect in that every stroke of a piston requires that it come to a complete stop.

There is a long felt unmet demand for more efficient internal combustion reciprocating parts motors. The use of rotary motors, often referred to as Wankel motors, is known in the prior art in various forms. Of those found, the closest patent to the present invention was issued to Knickerbocker. Knickerbocker, U.S. Pat. No. 3,923,014 discloses a rotary motor utilizing a pair of complimentary rotors in place of a typical piston design. However, Knickerbocker fails to disclose the regulated intake necessary to achieve even a modest level of efficiency. Without a controlled intake mechanism an ignited fuel and air mixture will enter the air supply and significantly decrease its effectiveness. The Knickerbocker design reveals other deficiencies as well. For example, it cannot accommodate dual ignition without substantial modifications.

SUMMARY OF THE INVENTION

It is an object of the present invention to provide an efficient rotary motor.

It is another object of the present invention to provide a rotary motor utilizing a controlled intake which preserves the pressurization of an adjacent plenum.

It is another object of the present invention to provide a rotary motor capable of efficiently utilizing dual ignition within a single piston assembly.

It is yet another objective of the present invention to provide a rotary motor providing sufficient combustion area in all rotary chambers so as to maximize overall viability of the motor.

It is a further object of the present invention to provide a rotary motor maximizing removal of spent fuel based on positioning of the exhaust.

It is a further object of the present invention to provide a rotary motor having a balanced design with minimal vibration.

It is a further object of the present invention to provide a rotary motor having a high degree of utility as a pump.

It is a further object of the present invention to provide a rotary motor designed with efficient means of cooling and oiling.

It is a further object of the present invention to provide a first piston rotary assembly designed to work in conjunction with a second piston rotary assembly to provide a four ignition rotary motor.

It is another object of the present invention to provide a method of operation for a rotary motor to increase efficiency over the known art.

In satisfaction of these and related objectives, the present invention provides a novel rotary motor with increased efficiency and maximum performance resulting from a particularly designed controlled intake mechanism and dual ignition means. Other features of the motor add to its overall efficiency and performance as disclosed herein.

DETAILED DESCRIPTION OF THE PREFERRED EMBODIMENT

Figure 1:
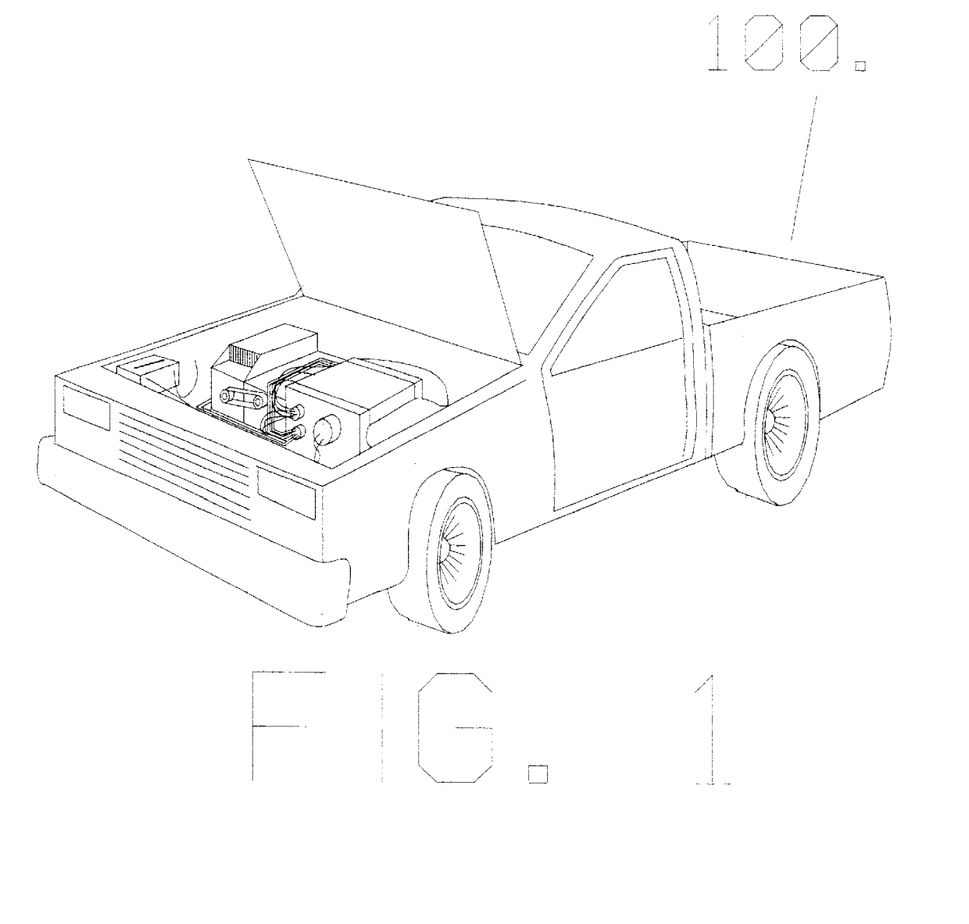
FIG. 1 is a perspective view of an automobile within which the preferred embodiment of the present invention would be best utilized.

In FIG. 1 an automobile 100 is shown. Such an automobile 100 is one of many types of systems in which the preferred embodiment of the present invention can be utilized.

Figure 2:
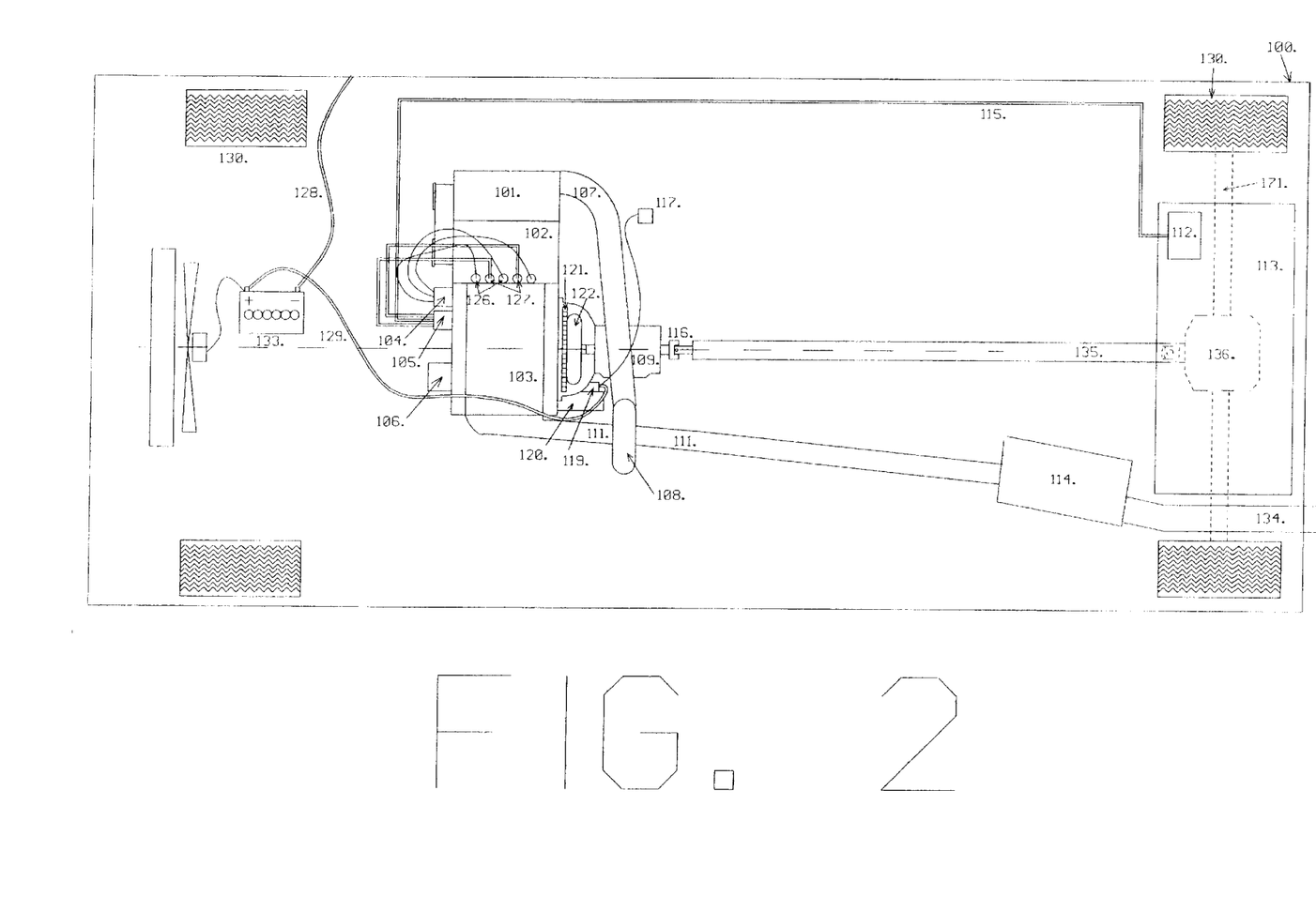
FIG. 2 is a cross section of the automobile illustrating the placement of the preferred embodiment of the present invention.

FIG. 2 shows a cross sectional view of the automobile 100 showing the preferred placement of the preferred embodiment of the present invention. Other placements of the invention may be feasible. In order to fully understand the present invention it is important to trace the path of a typical automobile 100 startup. When a person wants to start the automobile 100, he or she will put a key (not shown) into an ignition key switch 117 and turn over the ignition key switch 117 into a start position. The ignition key switch 117 is connected to a starter solenoid 119 within a starter 120 by way of a wire or the like.

When the ignition key switch 117 is switched to the start position, a circuit between a battery 133 and the starter solenoid 119 is closed allowing charge to flow from the positive terminal of the battery 133 along a positive battery cable 129 to the starter solenoid 119. The negative terminal of the battery 133 is grounded by an electrical ground wire 128 to the side of the automobile 100.

The starter solenoid 119 is an electromagnet when it carries the current and the amount of current flowing through the electromagnet is directly proportionate to its magnetism. The magnetic field of the starter solenoid 119 causes a bendix (not shown) within the starter 120 to begin spinning. Gears on the bendix (not shown) mesh with teeth on a flywheel 121. The flywheel 121 then engages a camshaft (not shown) which starts the cam (not shown) turning. The cam (not shown) engages a piston or small rotor 137 (see FIG. 3a) rotating the small rotor 137 (see FIG. 3a) in a clockwise direction. The small rotor 137 (see FIG. 3a) rotates a large rotor 138 (see FIG. 3a) in a counterclockwise direction by way of a gear assembly (see FIGS. 5a and 5b). The rotation of the rotors 137 (see FIG. 3a) and 138 (see FIG. 3a) acts as a combustion chamber to maintain constant mechanical power within the motor block 103. This mechanical power source in turn converts to electrical power in an alternator 106 which maintains the source of electrical current for the present invention. The byproducts of the combustion process pass out through an exhaust port 158 (see FIG. 3a) into the exhaust pipe 111 into the muffler/catalytic converter 114 and out through the exhaust tailpipe 134.

Once the engine is started, an individual driver can set the automobile 100 into a drive mode by accessing the transmission 109. The transmission 109 contains a torque converter 122 which is connected at one end to a drive shaft 135 by way of a drive shaft universal ("u")joint 116. The other end of the drive shaft 135 is hooked to a differential 136 at the rear end of the automobile 100. The gears at the differential 136 turn the axles 171 which engage the wheels 130.

Figure 3A:
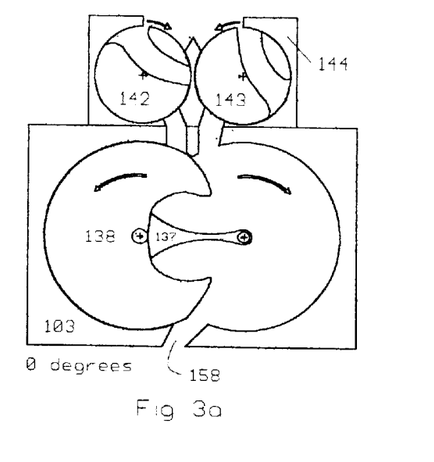
FIG. 3a depicts the positioning of the valve assembly and motor rotors with respect to one another at a first fixed position for each rotor.
Figure 3B:
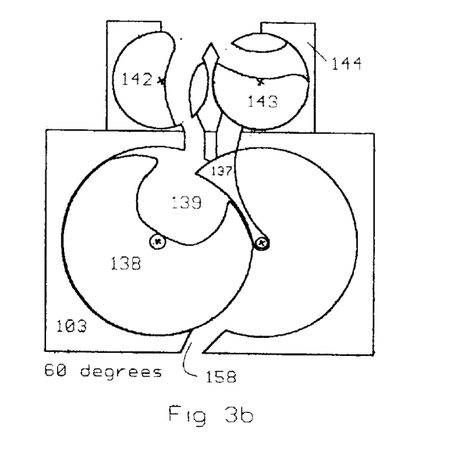
FIG. 3b depicts the positioning of the valve assembly and motor rotors with respect to one another at a position 60° removed from the first fixed position of each rotor.

In FIGS. 3a–3h, a cross sectional view of a small rotor 137, a large rotor 138, and the present invention, the motor block 103, are shown. In FIG. 3a the small rotor 137 and the large rotor 138 are shown at a fixed position relative to one another. Although the rotors abut one another, they do not make contact at any point during a combustion cycle. That is, there is no direct contact between the rotors in FIGS. 3a–3f. The planes of rotation for the small rotor 137 and the large rotor 138 are preferably surrounded by a water jacket.

Figure 3C:
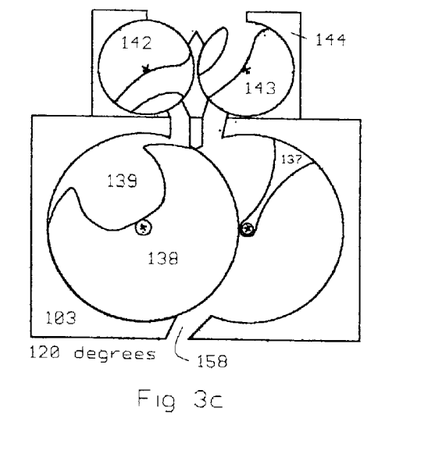
FIG. 3c depicts the positioning of the valve assembly and motor rotors with respect to one another at a position 120° removed from the first fixed position of each rotor.
Figure 3D:
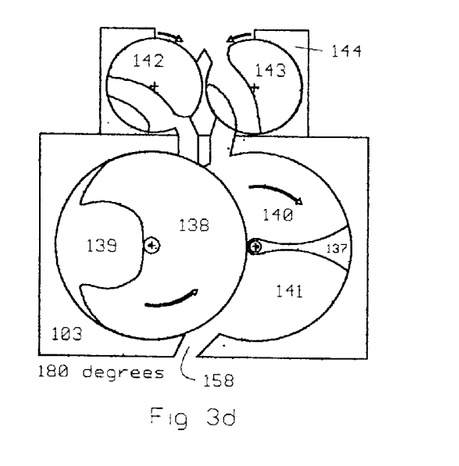
FIG. 3d depicts the positioning of the valve assembly and motor rotors with respect to one another at a position 180° removed from the first fixed position of each rotor.
Figure 3E:
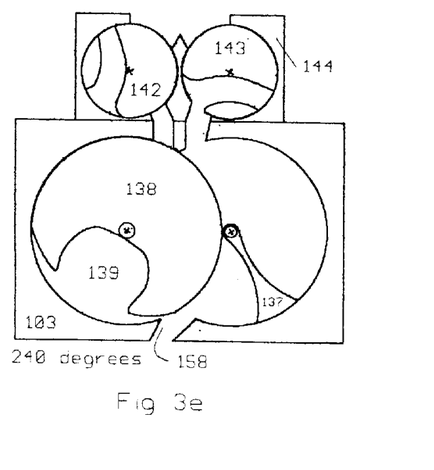
FIG. 3e depicts the positioning of the valve assembly and motor rotors with respect to one another at a position 240° removed from the first fixed position of each rotor.
Figure 3F:
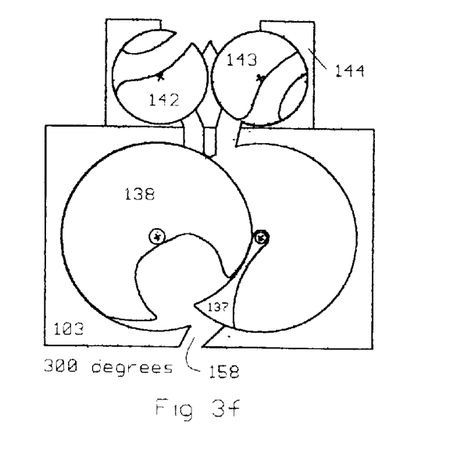
FIG. 3f depicts the positioning of the valve assembly and motor rotors with respect to one another at a position 300° removed from the first fixed position of each rotor.

Referring specifically to FIG. 3d, a smaller first combustion chamber 139 is apparent in contrast to a larger second combustion chamber 140. A closed spent fuel chamber 141 is also apparent at this point.

Beginning with the fixed position of the rotors (shown in FIG. 3a) the small rotor 137 is shown moving in a clockwise direction in a progression, at every 60°, through to FIG. 1f. The large rotor 138 is shown moving in a counterclockwise direction throughout this same progression. This progression represents movement during a combustion cycle.

FIGS. 3a–3f also reveal a first valve 142 and a second valve 143 within a housing 144 which is engaged to the motor block 103. Again, beginning with the fixed position of the valves 142 and 143 (shown in FIG. 3a) the first valve 142 is shown moving in a clockwise direction (at the same rate as the small rotor 137) in a progression, at every 60°, through to 12 FIG. 3f. Again, the second valve 143 is shown moving in a counterclockwise direction (at the same rate as the large rotor 138) throughout this same progression. This represents valve progression during a combustion cycle.

With reference to FIG. 3d, the larger second combustion chamber 140 and spent fuel chamber 141 are shown with an exhaust port 158 trailing therefrom. Again with reference to FIG. 3d, the exhaust port 158 is best positioned near the terminal end of what will constitute the spent fuel chamber 141. This is to encourage maximum evacuation of spent fuel. Additionally, the small rotor 137 and the large rotor 138 are designed to provide maximum volumes within the first combustion chamber 139 and second combustion chambers 140 (as shown in FIG. 3d).

Figure 4:
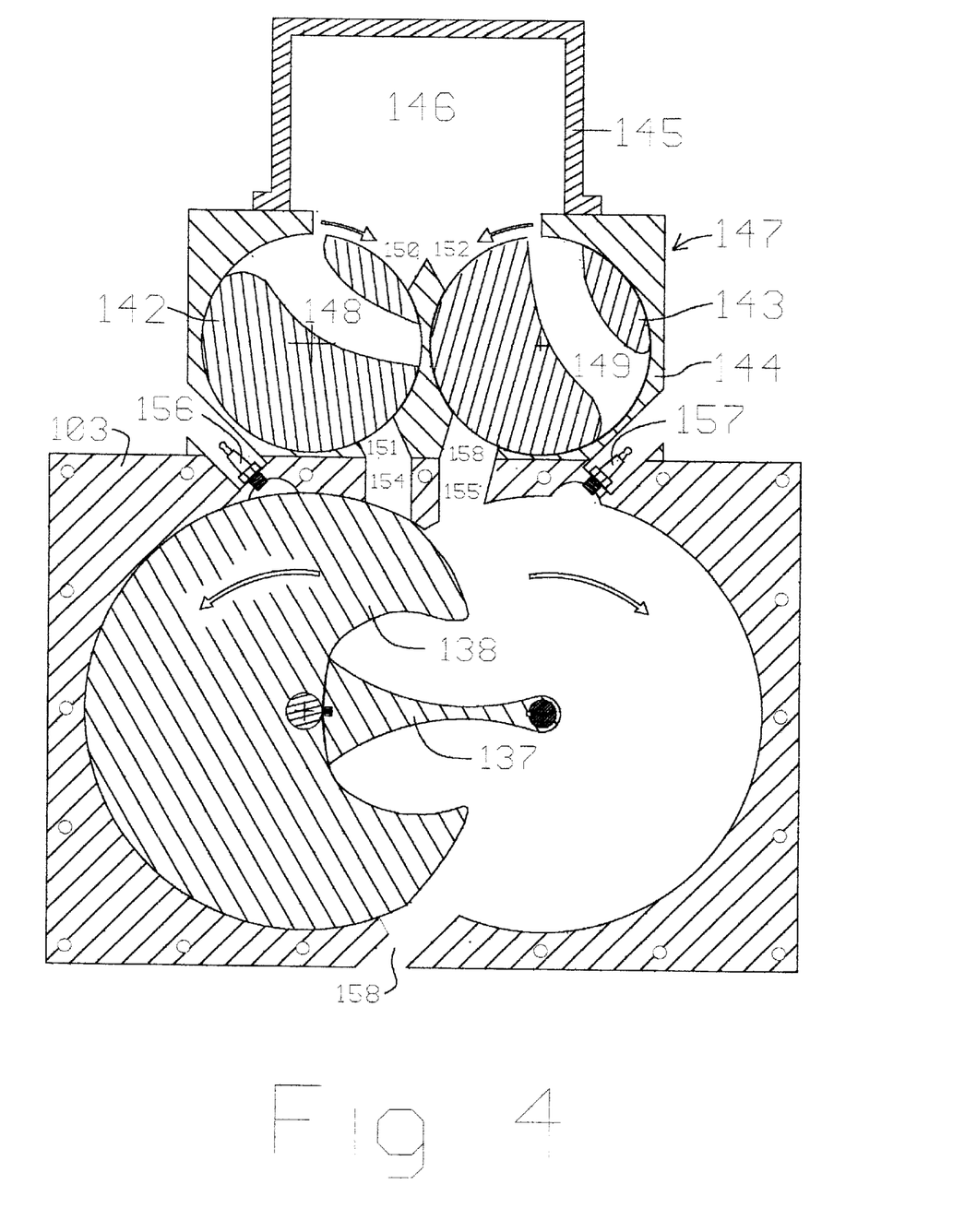
FIG. 4 is a front cross sectional view of the motor detailing air intake, dual combustion and other features.

Referring to FIG. 4, a plenum casing 145 and plenum 146 are provided. These are typically found with superchargers 101 (see FIG. 2). The plenum casing 145 seals pressurized air within the plenum 146 allowing its regulated escape only through the valving mechanism 147 provided. The valving mechanism 147 consists of the first valve 142 having a first inlet port 148 and a second valve 143 having a second inlet port 149. The valving mechanism 147 is encased within the housing 144. The housing 144 has a first upper housing port 150 and a first lower housing port 151 which are sealable by the first valve 142. The housing 144 also provides a second upper housing port 152 and a second lower housing port 153 which are sealable by the second valve 143. The lower housing ports 151 and 153 are in continuous alignment with a first block port 154 and a second block port 155. FIG. 4 also discloses a first spark plug 156 and a second spark plug 157. Although spark plugs 156 and 157 are shown, other combustion means may also be used.

In FIG. 4, pressurized air is let in from the plenum 146 and through the first upper housing port 150 and the first inlet port 148 as the first valve 142 moves from the resting position (see FIG. 3a) to at least 30° (not shown). Pressurized air continues through the first inlet port 148 and into the first lower housing port 151 and first block port 154 as the first valve 142 moves beyond 30° and continues until the first valve 142 reaches at least 75°. It is during this stage of rotation (i.e. between 30° and 75°) that a combustible material, fuel, is let into the smaller first combustion chamber 139 behind the first spark plug 156 (see FIG. 3b). The fuel itself originates in the fuel tank 113 (see FIG. 2). The fuel is pumped by a fuel pump 112 (see FIG. 2) into a fuel line 115 (see FIG. 2). The fuel line 115 (see FIG. 2) terminates in a fuel injection distributor 105 (see FIG. 2) which in turn distributes the fuel through fuel injectors 127 (see FIG. 2) into the motor block 103.

Once the valves 142 and 143 and rotors 137 and 138 reach the 75° position a completely closed smaller first combustion chamber 139 has been formed (see for example FIG. 3c). At this point fuel is ignited by the first spark plug 156 powering the rotation of the large rotor 138.

The process is repeated with respect to the second valve 143 and the small rotor 137. That is, pressurized air is let in from the plenum 146 and through the second upper housing port 152 and the second inlet port 149 as the second valve 143 moves from about the 80° position (not shown) to about 120° (see FIG. 3c). Pressurized air continues through the second inlet port 149 and into the second lower housing port 153 and secondblock port 155 as the second valve 143 moves beyond 1200 and continues until the second valve 143 reaches 180°. It is during this stage of rotation (i.e. between 120° and 180°) that fuel is let into the larger second combustion chamber 140 behind the second spark plug 157. Once the valves 142 and 143 and rotors 137 and 138 reach at least the 180° position a completely closed larger second combustion chamber 140 has been formed (see FIG. 3d). At this point fuel is ignited by the second spark plug 157 powering the rotation of the small rotor 137.

The ignition propels the small rotor 137 clockwise within the spent fuel chamber 141 and forces the products of combustion out the exhaust port 158 as the small rotor 137 approaches its 300° position.

The rotors 137 and 138 and valves 142 and 143 continue onto their start position (as shown in FIG. 3a). The process continues without any stoppage of the rotors 137 and 138 or valves 142 and 143. Any air not taken in by the supercharger 101 (see FIG. 2) passes through turbo high pressure air tubing 107 (see FIG. 2) to an exhaust turbocharger 108 (see FIG. 2).

Figure 5A:
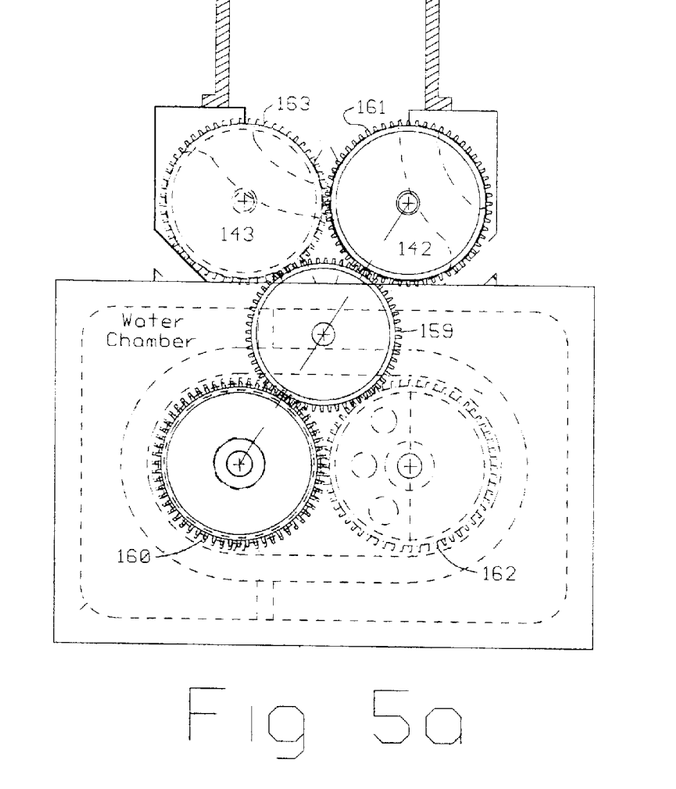
FIG. 5a is a rear cross sectional view of the motor detailing linkage between the air intake system and each rotor.

Referring to FIG. 5a, a rear sectional view of the motor is shown which reveals the gearing between the rotors 137 and 138 (see FIG. 4) (not shown) and the valves 142 and 143. A timing gear 159 is shown which rotates a small rotor gear 160 of the small rotor 137 (see FIG. 4) (not shown) and a first valve gear 161 of the first valve 142 respectively. In this manner, the small rotor 137 (see FIG. 4) and the first valve 142 maintain an equivalent rate of rotation while the motor is running. A large rotor gear 162 of the large rotor 138 (see FIG. 4)) is also shown which is gearably linked to the small rotor gear 160 and maintains an equivalent rate of rotation as to the small rotor 137 and large rotor 138 (see FIG. 4). Likewise, a second valve gear 163 of the second valve 143 is also shown which is gearably linked to the first valve gear 161 and maintains an equivalent rate of rotation as to the first valve 142 and second valves 143. While this is the manner chosen to maintain timing between all rotating parts, other means may be employed. However, the maintenance of timing between an air intake system and the rotors 137 and 138 is important to this embodiment of the invention.

Figure 5B:
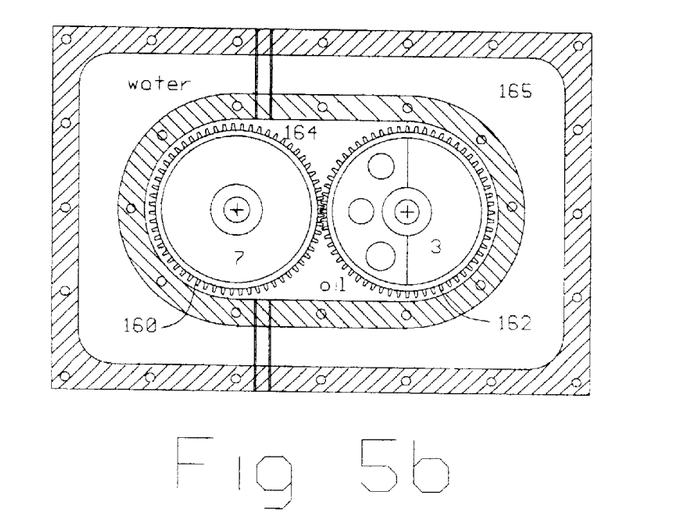
FIG. 5b is a rear cross sectional view of the motor detailing cooling and oiling features of the motor.

Referring to FIG. 5b, a rear sectional view of the motor is shown which reveals an oil chamber 164 and a water chamber 165. While the particular design chosen for cooling and oiling may vary, this depiction reveals how easily the present invention accommodates cooling and oiling. The motor design allows for the cooling and oiling to occur uniformly around the small rotor 137.

Figure 6A:
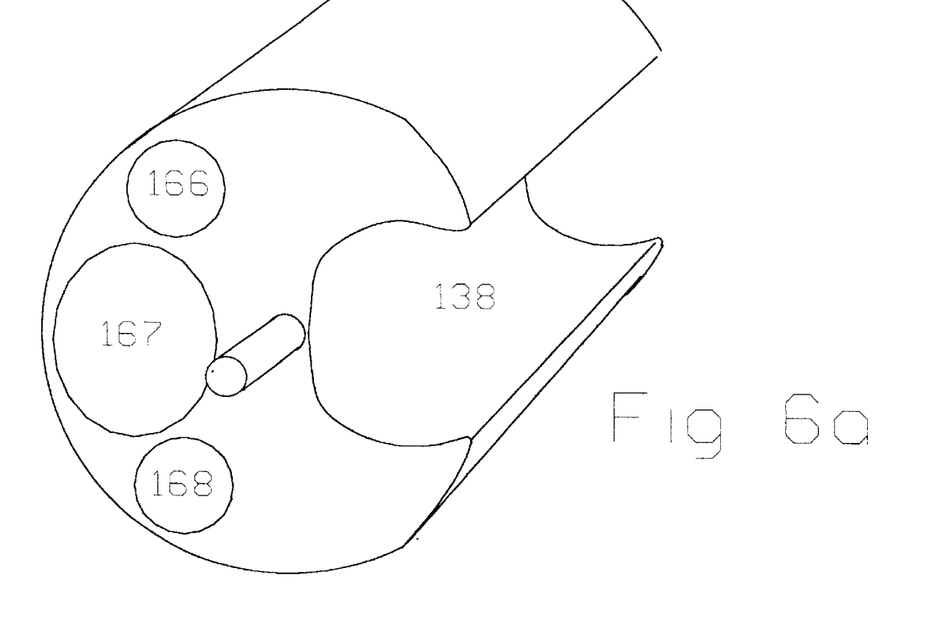
FIG. 6a depicts the large rotor alone detailing its balancing features.
Figure 6B:
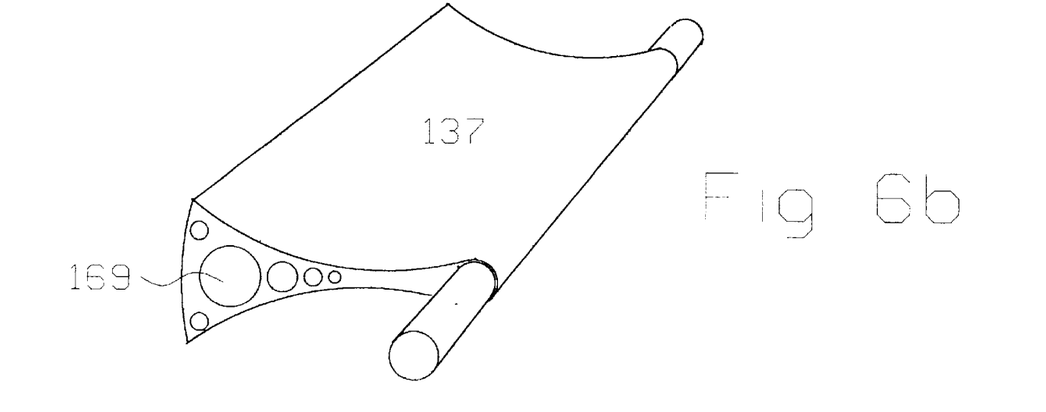
FIG. 6b depicts the small rotor alone detailing its balancing features.

Referring to FIGS. 6a and 6b, the large rotor 138 and small rotor 137 are shown independent of the motor block 103. While the precise design of the rotors 137 and 138 may vary, they should be designed with a degree of balance in mind. That is, they should be designed to minimize vibration of the motor block 103 while in use. This may be accomplished with use of hallowed areas 166, 167, 168, and 169 cored through the length of each rotor 137 and 138. Ideally, larger hallowed areas 166, 167, and 168 would be cored through the length of the large rotor 138.

Figure 7:
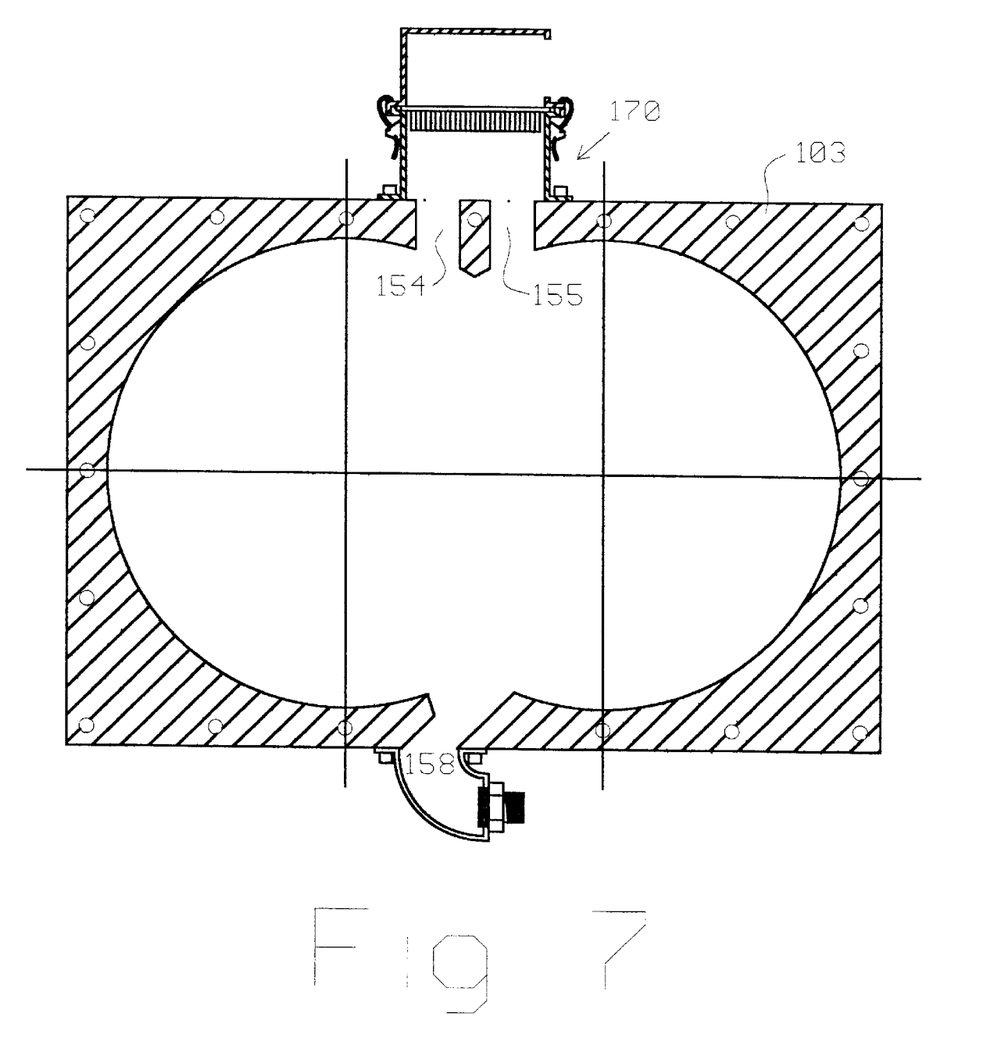
FIG. 7 is a front cross sectional view of the motor with modified application to a pump.

Referring to FIG. 7, a second embodiment of a pump design of the motor is shown. While this embodiment still incorporates the possibility of dual ignition, the valving mechanism 147 is not provided. The valving mechanism 147 has been replaced with a vacuum control 170. This embodiment of the motor is reflective of the natural vacuum created by the shown design of the rotors 137 and 138. The force of the vacuum is naturally exhibited at the first and second block ports 154 and 155, the intake areas of the motor. Therefore, a vacuum control 170 of various designs could naturally replace the previously disclosed valving mechanism 147 in order to take advantage of this vacuum power. This embodiment specifically removes the controlled intake in order to take advantage of a natural vacuum. While the controlled intake is eliminated, the resulting pump nevertheless has increased efficiency due to the dual ignition and other features previously described herein. Furthermore, the vacuum pump may easily be modified to work as a compressor.

Figure 8:
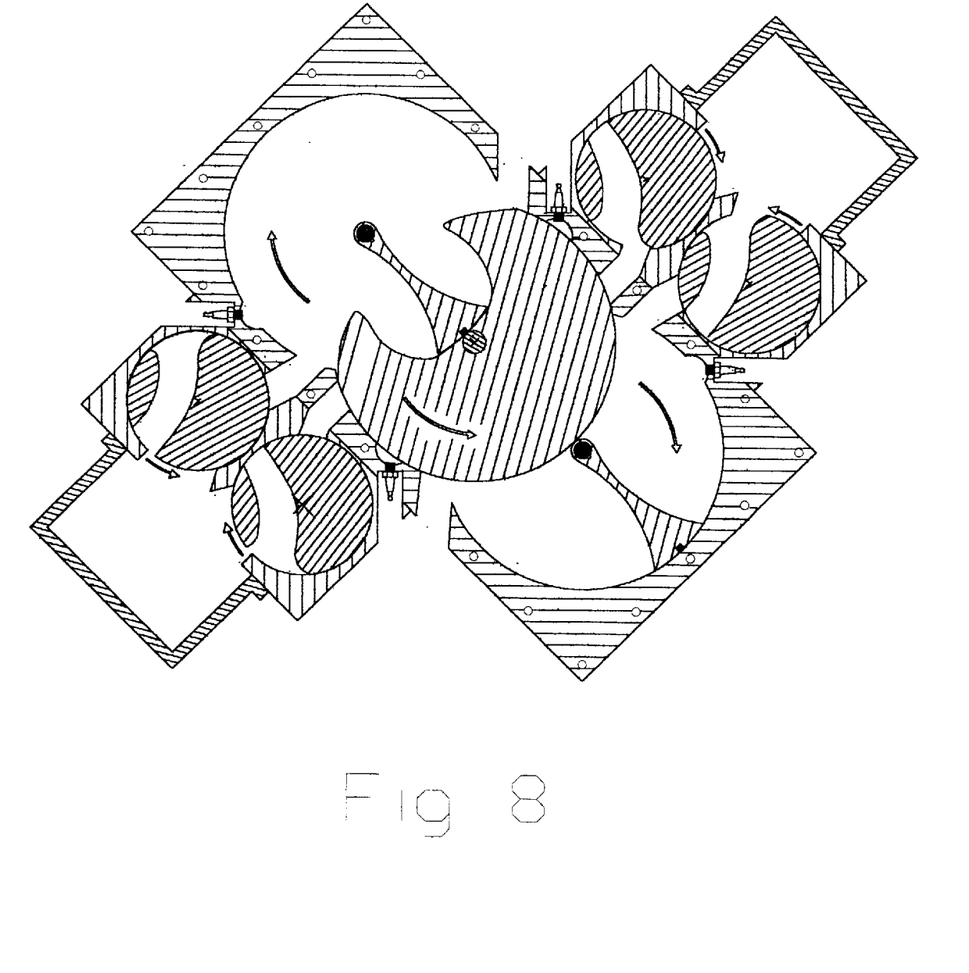
FIG. 8 is a front cross sectional view of the motor in dual cylinder form providing a four ignition motor.

FIG. 8 shows a front cross sectional view of the motor in dual cylinder form providing a four ignition motor.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A rotary motor comprising:
    a motor block;
    a small rotor contained within said motor block;
    a large rotor rotatably connected to said small rotor;
    a combustion chamber associated with said motor block;
    a first combustion means partially housed within said combustion chamber;
    an exhaust port located downstream of said combustion chamber; and
    a second combustion device partially housed within said combustion chamber for increasing efficiency of the system.

2. The rotary motor of claim 1 wherein said exhaust port receives products of combustion as said small rotor approaches 300°.

3. The rotary motor of claim 2 further comprising a valve means associated with said combustion chamber or maintaining pressurization of an adjacent plenum.

4. The rotary motor of claim 3 wherein said combustion chamber is created by the planes of rotation of said rotors.

5. The rotary motor of claim 4 wherein said rotors are balanced for minimal vibration.

6. The rotary motor of claim 5 further comprising a uniform cooling and oiling means around said small rotor.

7. The rotary motor of claim 6 further comprising at least two additional rotors associated with said first and second combustion means.

8. A method of rotary motor operation comprising the steps of:
    first letting air into a first inlet port while rotating a first valve;
    second letting air into a first block port while rotating said first valve;
    third letting combustible material into a first combustion chamber;
    first igniting said combustible material within said first combustion chamber powering rotation of a large rotor;
    fourth letting air into a second inlet port while rotating a second valve;

fifth letting air into a second block port while rotating said second valve;

sixth letting combustible material into a second combustion chamber;

second igniting said combustible material within said second combustion chamber powering rotation of a small rotor.

9. The method of rotary motor operation of claim 8 wherein said first letting step occurs while said first valve rotates from 0° to at least 30°.

10. The method of rotary motor operation of claim 9 wherein said second letting step occurs while rotating said first valve from 30° to at least 75°.

11. The method of rotary motor operation of claim 10 wherein said fourth letting step occurs while rotating said second valve from 80° to about 120°.

12. The method of rotary motor operation of claim 11 wherein said fifth letting step occurs while rotating said second valve from 120° to at least 180°.

13. The method of rotary motor operation of claim 12 wherein said first letting step into said first inlet port occurs way of a first upper housing port.

14. The method of rotary motor operation of claim 13 wherein said second letting step into said first block port occurs way of first lower housing port.

15. The method of rotary motor operation of claim 14 wherein said fourth letting step into said second inlet port occurs way of a second upper housing port.

16. The method of rotary motor operation of claim 15 wherein said fifth letting step into said second block port occurs way of a second lower housing.

17. The method of rotary motor operation of claim 16 further comprising a preliminary step of letting air in through a plenum before passage to said first inlet port.

18. The method of rotary motor operation of claim 17 further comprising the step of forcing the products of combustion out an exhaust port.

19. The method of rotary motor operation of claim 18 wherein said forcing step occurs as said small rotor approaches 300°.

20. A rotary motor comprising:

a motor block;

a first small rotor contained within said motor block;

a large rotor contained within said motor block and rotatably connected to said first small rotor;

a first combustion chamber associated with said motor block;

a first combustion device extending into said first combustion chamber;

a first exhaust port downstream of said first combustion chamber;

a second small rotor contained within said motor block and rotatably connected to said large rotor;

a second combustion chamber associated with said motor block;

a second combustion device extending into said second combustion chamber; and a second exhaust part downstream of said second combustion chamber.

* * * * *